(12) United States Patent
Cook et al.

(10) Patent No.: US 11,451,514 B2
(45) Date of Patent: Sep. 20, 2022

(54) OPTIMIZING RULES FOR CONFIGURING A FIREWALL IN A SEGMENTED COMPUTER NETWORK

(71) Applicant: Illumio, Inc., Sunnyvale, CA (US)

(72) Inventors: Daniel Richard Cook, San Jose, CA (US); Anish Vinodkumar Desai, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 932 days.

(21) Appl. No.: 16/239,492

(22) Filed: Jan. 3, 2019

(65) Prior Publication Data
US 2020/0220845 A1 Jul. 9, 2020

(51) Int. Cl.
*H04L 9/40* (2022.01)
*G06F 9/50* (2006.01)
*H04L 41/0823* (2022.01)

(52) U.S. Cl.
CPC ........ *H04L 63/0263* (2013.01); *G06F 9/5061* (2013.01); *H04L 41/0823* (2013.01); *H04L 63/20* (2013.01); *G06F 2209/506* (2013.01); *G06F 2209/5022* (2013.01)

(58) Field of Classification Search
CPC . H04L 63/0263; H04L 41/0823; H04L 63/20; G06F 9/5061
See application file for complete search history.

(56) References Cited

U.S. PATENT DOCUMENTS

| | | | |
|---|---|---|---|
| 9,894,100 B2 | 2/2018 | Pernicha | |
| 10,135,727 B2 | 11/2018 | Gude et al. | |
| 10,848,462 B2 * | 11/2020 | Das | H04L 63/0263 |
| 2009/0144414 A1 * | 6/2009 | Dolisy | G06F 16/24556 709/224 |
| 2009/0300748 A1 | 12/2009 | Diehl et al. | |
| 2014/0259146 A1 * | 9/2014 | Zuk | H04L 63/0263 726/13 |

(Continued)

OTHER PUBLICATIONS

Liu et al. (Complete Redundancy Detection in Firewalls, LNCS 2008, pp. 196-209) (Year: 2008).*

(Continued)

*Primary Examiner* — Oleg Korsak
(74) *Attorney, Agent, or Firm* — Fenwick & West LLP

(57) ABSTRACT

An enforcement module receives management instructions from a segmentation server for enforcing a segmentation policy. The management instructions include one or more rules specifying one or more groups of workloads that a workload executing on the operating system instance is permitted to communicate with according to certain communication constraints, and membership information specifying workload identifiers for workloads in each of the groups. An optimization module processes the management instructions to reduce the number of rules and the number of workload groups to which the rules apply, thereby simplifying the firewall configuration. The enforcement module then configures a firewall according to the optimized rules to enforce the segmentation policy. The optimization process beneficially improves performance of the firewall and thereby enables more efficient enforcement of the segmentation policy utilizing fewer computing resources.

20 Claims, 4 Drawing Sheets

(56) References Cited

U.S. PATENT DOCUMENTS

| | | | | |
|---|---|---|---|---|
| 2015/0207821 A1* | 7/2015 | Kazachkov | ............. | G06F 21/57 |
| | | | | 726/1 |
| 2016/0191466 A1* | 6/2016 | Pernicha | ................ | H04L 63/20 |
| | | | | 726/1 |
| 2018/0091474 A1* | 3/2018 | Tulasi | .................... | H04L 63/02 |
| 2018/0234459 A1 | 8/2018 | Kung et al. | | |
| 2018/0260252 A1 | 9/2018 | Schiff et al. | | |
| 2018/0375802 A1* | 12/2018 | Wackerly | ............ | H04L 41/0893 |
| 2019/0007453 A1* | 1/2019 | Nimmagadda | ........ | G06N 5/025 |
| 2019/0007454 A1* | 1/2019 | Nimmagadda | ......... | H04L 47/24 |

OTHER PUBLICATIONS

Illumio (Eliminating Firewall Rule Proliferation, 2018, 14 pages) (Year: 2018).*

Yoon et al. (Reducing the Size of Rule Set in a Firewall, ICC 2007, 6 pages) (Year: 2007).*

PCT International Search Report and Written Opinion, PCT Application No. PCT/US2020/012098, dated Mar. 25, 2020, 16 pages.

* cited by examiner

OPTIMIZING RULES FOR CONFIGURING A FIREWALL IN A SEGMENTED COMPUTER NETWORK

BACKGROUND

Technical Field

This application relates to enforcing a segmentation policy that controls communications between workloads.

Description of Related Art

A segmentation policy comprises a set of rules that control which workloads may communicate on a network and place restrictions on how such workloads may communicate. For example, in a large enterprise network, a segmentation policy may be designed to enable a certain groups of workloads associated with certain geographic locations, roles, applications or other characteristics to communicate with a limited set of other workloads desirable to facilitate use of certain services, while blocking communications outside the intended use of the services, thereby reducing the likelihood of malicious activity. To enforce the segmentation policy, a segmentation server distributes management instructions to operating system instances managing the workloads. The management instructions cause the operating system instances to configure their respective firewalls in accordance with the segmentation policy. As the number of workloads and complexity of the segmentation policy grows, the number of firewall rules may also increase significantly. As the number of firewall rules grows, management of the rules becomes significantly more challenging and performance of the firewalls may suffer.

SUMMARY

An enforcement module optimizes a set of rules for configuring a firewall to enforce a segmentation policy. The enforcement module obtains initial management instructions for controlling communications of a target workload executing on an operating system instance of a computing device. The initial management instructions comprise an initial set of rules specifying respective groups of workloads permitted to communicate with the target workload and specifying respective constraints on communications between the target workload and the respective group of workloads. The initial management instructions furthermore comprise membership information providing a set of workload identifiers having membership in each of the respective groups of workloads. The enforcement module generates, from the initial set of rules, a reduced set of rules that collapses sets of rules corresponding to the same communication constraint into respective single rules. The enforcement module furthermore generates, from the initial membership information, a reduced set of group identifiers that each represent a unique group of workloads. The enforcement module re-maps the reduced set of rules to the reduced set of group identifiers. The enforcement module then configures a firewall of the operating system instance according to the re-mapped rules.

In a particular embodiment, the initial rule set received by the enforcement module includes at least a first initial rule and a second initial rule. The first initial rule references a first group of workloads permitted to communicate with a target workload executing on the operating system instance in accordance with a first connection constraint. The second initial rule references a second group of workloads permitted to communicate with the target workload executing on the operating system instance in accordance with a second connection constraint. The enforcement module also receives first membership information specifying a first set of workload identifiers having membership in the first group of workloads and second membership information specifying a second set of workload identifiers having membership in the second group of workloads. The enforcement module processes the first membership information and the second membership information to determine that the first set of workload identifiers and the second set of workload identifiers are a matching set of workload identifiers. The enforcement module assigns a unique group identifier to the matching set of workload identifiers. The enforcement module generates from the initial rule set, a simplified first rule and a simplified second rule each referencing the unique group identifier for the matching set of workload identifiers. The enforcement module then configures a firewall to enforce the reduced rule set.

In another embodiment, the enforcement module determines that the first connection constraint and the second connection constraint are a matching connection constraint. The enforcement module collapses the first initial rule and the second initial rule into a collapsed rule specifying the matching connection constraint and specifying that a union of the first group of workloads and the second group of workloads are permitted to communicate with the target workload in accordance with the matching connection constraint. The enforcement module generates from the initial rule set, a reduced rule set that replaces the first initial rule and the second initial rule with the collapsed rule. The enforcement module then configures a firewall to enforce the reduced rule set.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

An enforcement module executing on an operating system instance hosting one or more workloads receives management instructions from a segmentation server for enforcing a segmentation policy. The management instructions include one or more rules specifying one or more groups of workloads that a workload executing on the operating system instance is permitted to communicate with according to certain communication constraints, and membership information specifying workload identifiers for workloads in each of the groups. The management instructions may include significant redundancies in the rules and the membership information resulting from how the segmentation server generates and defines the segmentation policy at a high level of abstraction. An optimization module processes the management instructions to reduce the number of rules and the number of workload groups to which the rules apply, thereby simplifying the firewall configuration. The enforcement module then configures a firewall according to the optimized rules to enforce the segmentation policy. The optimization process beneficially improves performance of the firewall and thereby enables more efficient enforcement of the segmentation policy utilizing fewer computing resources.

Figure 1:
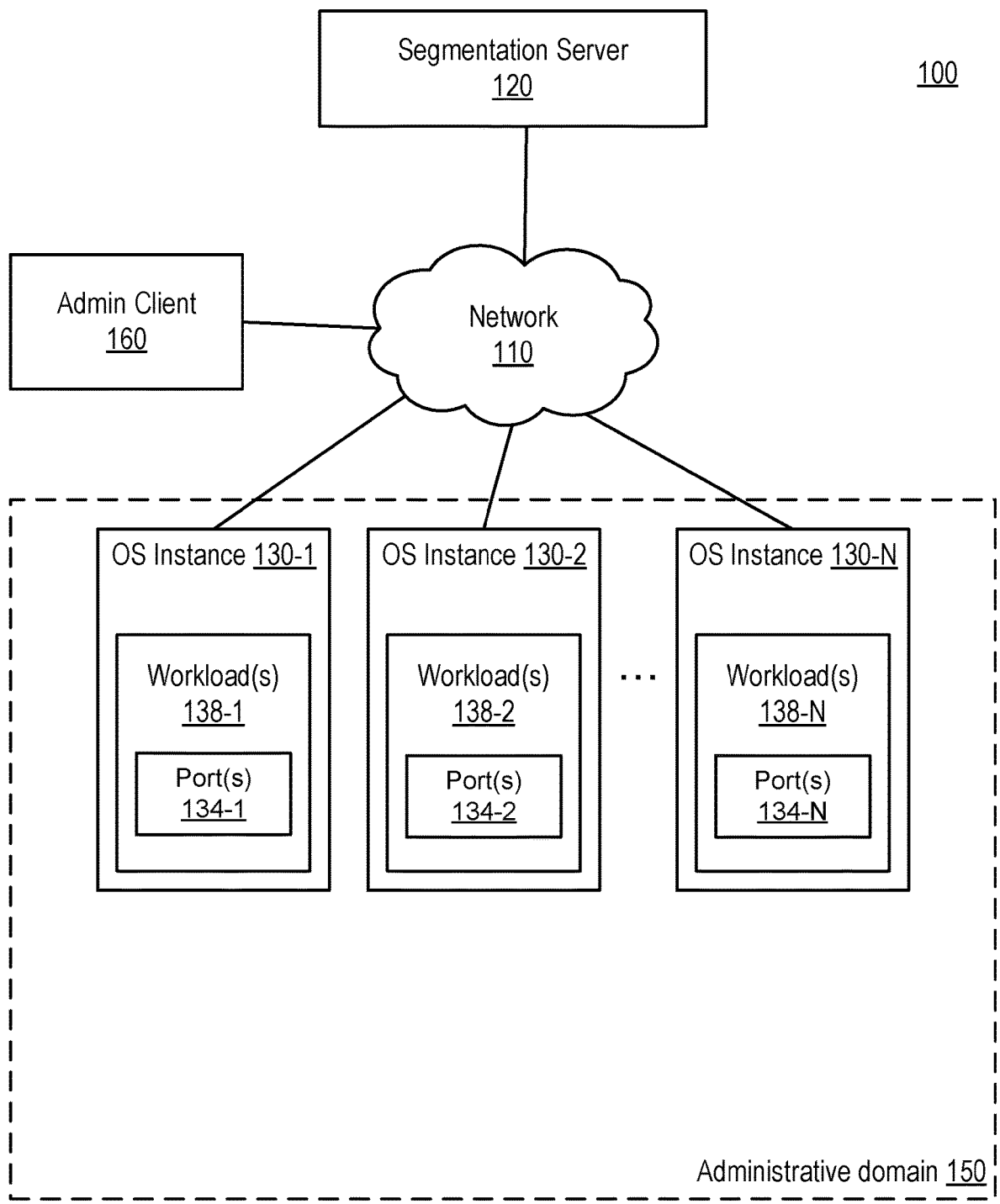
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of operating system (OS) instances 130 (e.g., OS instances 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130 The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 that may be independently addressable and may perform different independent computing functions. The workloads 138 on the OS instances 130 may communicate with other workloads 138 on different OS instances 130 within the administrative domain 150 to perform various tasks.

A workload 138 communicates over one or more ports 134. A port 134 comprises a logical communication endpoint for a particular service that is provided by or used by a workload 138. A port 134 on a workload 138 may be identified by a port identifier that may specify, for example, an IP address associated with the workload 138 and a port number. Specific port numbers may be used consistently across different workloads 138 in association with specific services. Thus, the port number can often identify the service and vice versa. For example, port 80 is typically used for hyper-text transfer protocol (HTTP) traffic on any workloads 138 that provide or consume HTTP-based web services and port 5432 is typically used for any TCP traffic associated with PostgreSQL database services. In other instances, the same services on different workloads 138 may utilize different port numbers that are not necessarily consistent, or different services may utilize the same port numbers.

Communication over the ports 134 may also occur in accordance with certain specified communication protocols, which may also be associated with the service. Common protocols include, for example, the transmission control protocol (TCP) and the user data protocol (UDP).

The segmentation server 120 is a computer (or set of computers) that obtains and stores information about the OS instances 130 on the network 120 and the workloads 138 executing on the OS instances 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, each workload may belong to one or more workload groups. The workload groups may each be associated with a set of common labels assigned to the workloads in the group. The labels assigned to each workload 138 define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of workloads) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the OS instances 130 and the workloads 138 managed by the segmentation server 120. For example, the segmentation server 120 may store, for each OS instance 130, workload identifiers for workloads 138 associated with the OS instance 138 and membership information indicating one or more groups of workloads 138 to which each workload 138 belong (e.g., as defined by the respective label sets for the workloads 138).

Table 2 illustrates an example of information stored by the segmentation server 120. The workload ID(s) represent the workload identifier for the workload(s) 138 executing on each OS instance 130. The workload identifier may comprise, for example, an IP address or other identifier that uniquely identifies the workload 138. The memberships represent groups to which one or more workloads 138 executing on the OS instance 130 belongs. Each group may correspond to a unique label set involving one or more dimensions.

TABLE 2

Example of a Repository Table

| Workload ID(s) | Memberships |
| --- | --- |
| ID1 | A, C, D |
| ID2 | B, C |
| ID3 | D |
| . | . |
| . | . |
| . | . |
| IDn | B, D, E, F |

Instead of enforcing the segmentation policy at a centralized device, the segmentation policy is instead enforced by at least a subset of the OS instances 130. To enable enforcement of the segmentation policy, the segmentation server 120 generates a set of management instructions and distributes the management instructions to the OS instances 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different OS instances 130 so that each OS instance 130 gets only the management instructions relevant to its operation. Here, the segmentation server 120 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation server 120 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Beneficially, the relevant rules and relevant membership information may be sent to the OS instances 130 separately from each other. Independently sending relevant rules and relevant membership information may improve the efficiency of updates when the segmentation policy changes or when workloads are added or removed from the network 110. For example, in response to a change in the segmentation policy, the segmentation server 120 may send updated rules to the affected OS instances 130 but need not re-send the membership information absent any changes. Similarly, in response to a change in membership information (e.g., a new workload being added to the network or being re-assigned to a new label set), the segmentation server 120 may send updated membership information to the affected OS instances 130 without necessarily re-sending the rules. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the OS instances 130 and workloads 138 on the network 120 and view traffic flows between the workloads 138.

Figure 2:
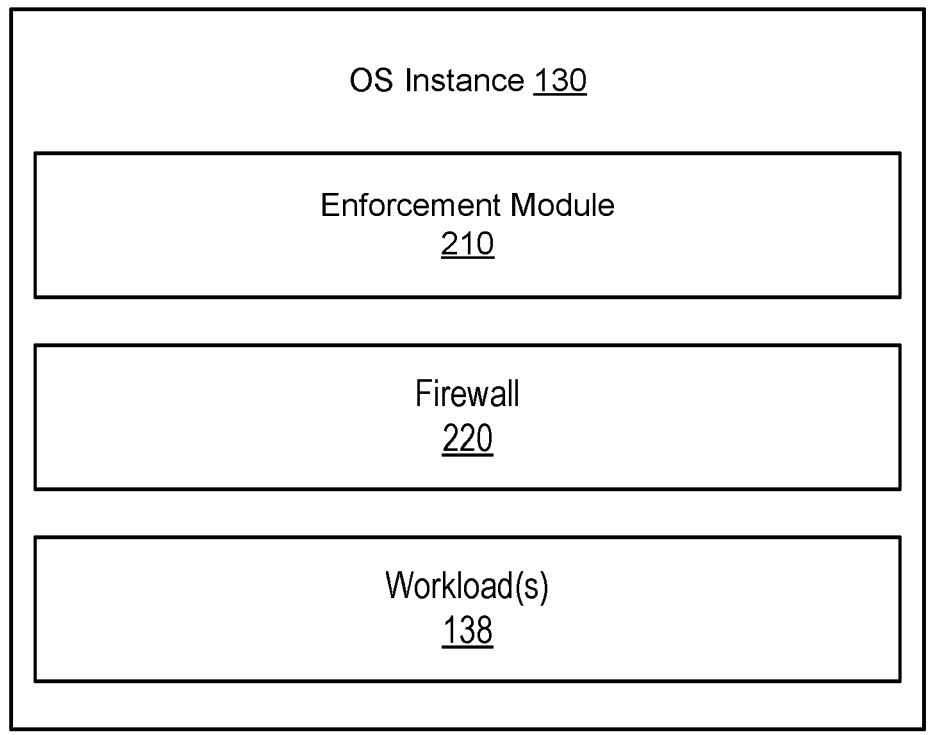
FIG. 2 is a block diagram illustrating example embodiments of an operating system instance.

FIG. 2 illustrates example embodiments of OS instances 130. The OS instance 130 comprises an enforcement module 210, a firewall 220, and one or more workloads 138. The firewall 220 monitors and controls incoming and outgoing traffic to and from a workload 138 of the operating system instance 130 in accordance with a set of firewall rules. The firewall 220 may comprise, for example, an operating system-level firewall, an Internet Protocol security (IPsec) engine, or a network traffic filtering engine (e.g., based on the Windows Filtering Platform (WFP) development platform). The firewall may be configured in accordance with a table in which each entry specifies a workload identifier (e.g., IP address) of another workload 138 that the workload 138 is permitted to communicate with, a port 134 over which communications are permitted, and a permitted protocol for the communications. The firewall 220 may furthermore operate to block communications that are not expressly permitted in the firewall rules.

The enforcement module 210 receives the management instructions including the relevant rules and the relevant membership information from the segmentation server 120 and translates the management instructions from a high level of abstraction to a low level of abstraction. For example, for a given rule that permits communication between a workload 138 executing on the OS instance 130 and a group of other workloads 138 having a label set A, the enforcement module 210 determines from the relevant membership information, workload identifiers for each of the workloads 138 having the label set A, and configures firewall rules to permit communications with the identified workloads 138 in accordance with any restrictions (e.g., ports and protocols) specified in the given rule.

Figure 3:
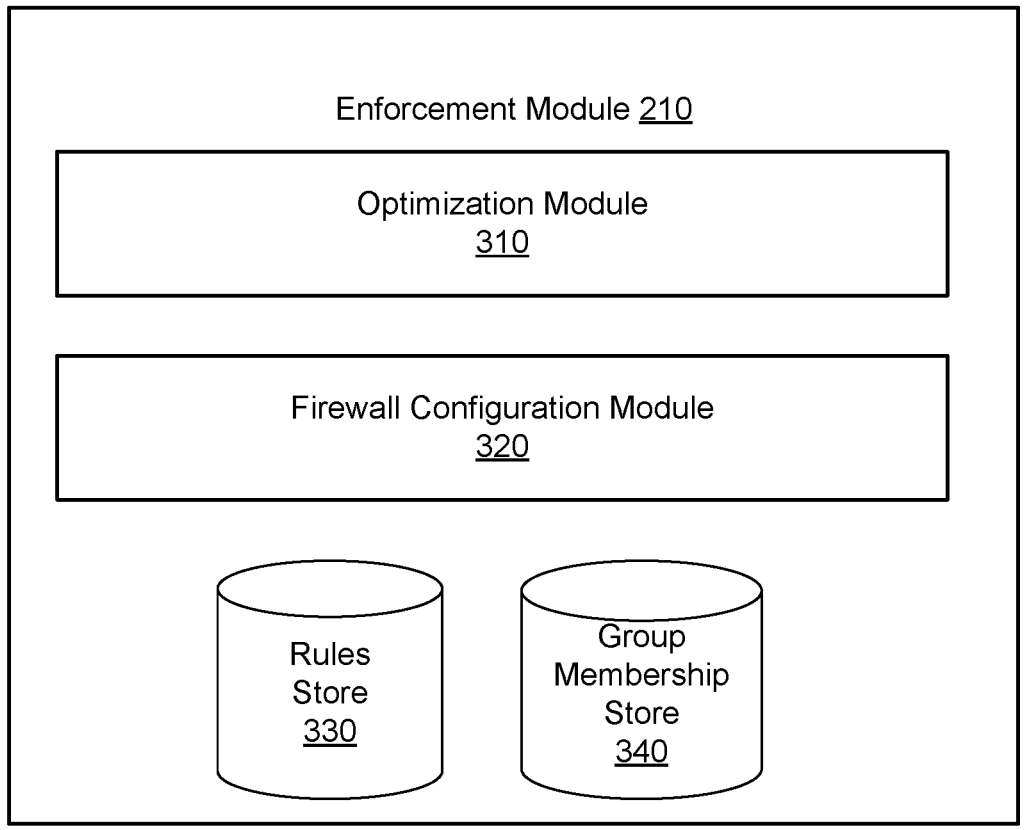
FIG. 3 is a block diagram illustrating an example embodiment of an enforcement module executing on an operating system instance.

FIG. 3 illustrates an example embodiment of an enforcement module 210. The enforcement module may comprise an optimization engine 310, a firewall configuration module 320, a rules store 330, and a group membership store 340. In alternative embodiments, the enforcement module 210 may comprise different or additional modules.

The rules store 330 stores the set of relevant rules received from the segmentation server 120. Each rule pertains to one or more workloads 138 executing on the OS instance 130 and specifies a group of workloads 138 that the one or more workloads 138 are permitted to communicate with and an indication of the ports and protocols over which the communications are permitted. Each rule may furthermore pertain only to providing of a service by a workload 138 of the OS instance 130 to other workloads 138, may pertain only to consuming of a service by a workload 138 executing on the OS instance 138 from other workloads 138, or may pertain to both providing and consuming of services. Additionally, a rule may pertain to only inbound communications to a workload 138 executing on the OS instance 130, may pertain to only outbound communications from a workload 138 executing on the OS instance 130, or may pertain to both inbound and outbound communications.

The group membership store 340 stores membership information indicating which specific workloads (referenced by unique workload identifiers) belong to each of the groups of workloads references in the relevant rules received by the OS instance 130. The workload identifiers may comprise, for example, an IP address or other identifier associated with the workload 138. The groups may be uniquely identified by a group identifier, which may be computed as a hash of an ordered list of the workload identifiers associated with each group, as will be described in further detail below.

The optimization module 310 processes the management instructions received from the segmentation sever 120 including the relevant rules and the membership information, and optimizes the management instructions to reduce the number of resulting rules used to configure the firewall 220. In a typical scenario, the initial management instructions may include significant redundancies because the segmentation server allows an administrator to configure the policy at a high level of abstraction. For example, an administrator may configure a first rule that enables all workloads 138 in New York to communicate over all ports and protocols with all workloads in San Francisco, and may configure a second rule that enables all production environment workloads 138 to communicate over all ports and protocols with each other. If New York and San Francisco both operate exclusively in the production environment, than the first rule is redundant to the second rule and can be removed to simplify the firewall configuration. In large administrative domains, such redundancies may become increasingly more frequent and increasingly complex to identify, especially as workloads 138 come online or go offline, or as the label sets of workloads 138 change. The optimization module 310 simplifies the rules used to configure the firewall by identifying an eliminating redundancies. Particularly, as described in further detail below with reference to FIG. 4, the optimization module 310 can reduce the resulting number of rules by collapsing the received relevant rules into a smaller number of rules, collapsing the membership information into a more concise representation of the membership, or a combination thereof.

The firewall configuration module 320 programs the firewall 220 based on the optimized set of rules generated by the optimization module 310. For example, the firewall configuration module 235 may program iptables or other filtering tables in order to enforce the segmentation policy.

Figure 4:
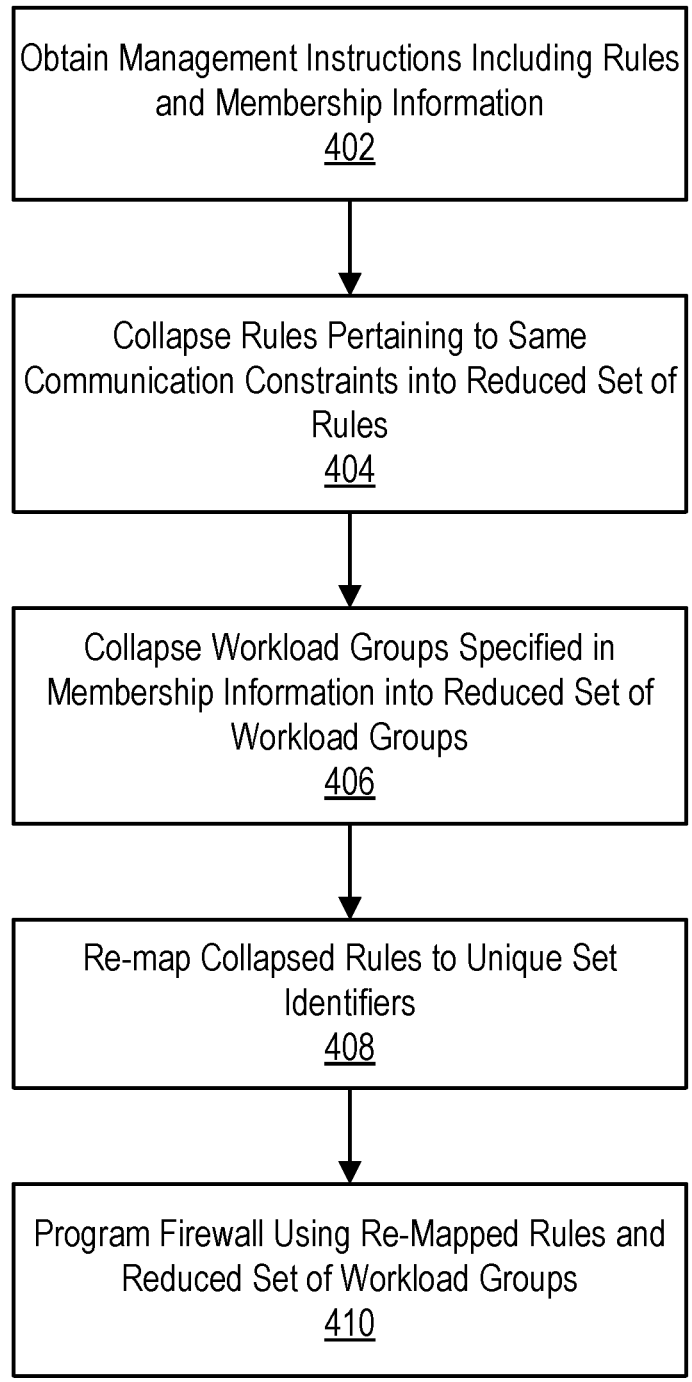
FIG. 4 is a flowchart illustrating an embodiment of a process for optimizing rules for configuring a firewall.

FIG. 4 is a flowchart illustrating an embodiment of a process for optimizing a rule set received by an enforcement module 210. The optimization module 310 receives 410 management instructions including a set of relevant rules pertaining to communications from one or more workloads 138 executing on the OS instance 130 and membership information specifying membership of other workloads 138 in the workload groups to which the rules are applicable. The optimization module 310 collapses 420 rules specifying the same communication constraints into a reduced set of rules. Here, the optimization module 310 identifies rules as having matching constraints if the rules pertain to the same type of communication (e.g., providing of a service, consuming of a service, or both), the same direction of communication (inbound, communication, outbound communication, or both), and are limited to the same ports and protocols. The optimization module 310 then generates a single rule from the identified subset of rules that applies to the union of the groups of workloads 138 specified in each individual rule in the subset. To illustrate this process, the below Table 3 includes an example set of rules permitting a given workload 138 of an OS instance 130 to receive inbound communications for providing services to different groups of workloads over certain ports and protocols:

TABLE 3

| Rule No. | Group | Port/Protocol |
| --- | --- | --- |
| 1 | A | 80/TCP |
| 2 | B | 53/UDP |
| 3 | C | 80/TCP |
| 4 | D | 5432/TCP |

Here, a first rule 1 indicates that the workload 138 is permitted to receive inbound communication for providing a service to a first group of workloads A using a port/protocol 80/TCP, a second rule 2 indicates that the workload 138 is permitted to receive inbound communication for providing a service to a second group of workloads B using a port/protocol 53/UDP, a third rule 3 indicates that the workload 138 is permitted to receive inbound communication for providing a service to a third group of workloads C using a port/protocol 80/TCP, and a fourth rule 4 indicates that the workload 138 is permitted to receive inbound communication for providing a service to a fourth group of workloads D using a port/protocol 5432/TCP. The optimization engine 310 detects that rules 1 and 3 specify the same constraint (port/protocol 80/TCP) and collapses rules 1 and 3 into a single rule that applies to both groups A and C. Furthermore, a new workload identifier E may be assigned to the group of workloads corresponding to the union of A and C. Thus, the initial four rules are collapsed into a set of only three rules as illustrated in Table 4 below:

TABLE 4

| Rule No. | Group | Port/Protocol |
| --- | --- | --- |
| 1 | E = A ∪ C | 80/TCP |
| 2 | B | 53/UDP |
| 3 | D | 5432/TCP |

Similar to the above example, other sets of rules having matching constraints may be collapsed into new rules. The updated rules may be stored to the rule store 330.

The optimization module 310 also collapses 406 workload groups in the membership information to a reduced set of workload groups. Here, the optimization module 310 first normalizes the set of workload identifiers in each group by removing redundant workload identifiers and orders the workload identifiers in each group according to predefined ordering criteria and notation. Once normalized, the optimization module 310 identifies groups corresponding to the same set of workload identifiers and collapses the identified groups into a single group. To illustrate this process, Table 5 illustrates an initial set of workload groups received by the OS instance 130 corresponding to the groups referenced in the rules:

TABLE 5

| Group | Workload Identifiers |
| --- | --- |
| E | 192.168.0.0/24 |
|   | 192.168.3.63 |
|   | 192.168.1.0/24 |
|   | 192.168.0.133 |
|   | 10.0.0.5 |
| B | 192.168.5.0/23 |
| D | 192.168.3.63 |
|   | 192.168.0.0/23 |
|   | 10.0.0.5 |
|   | 192.168.0.225 |

In the above table, workload identifiers are represented by IP addresses. Consecutive workload identifiers may be expressed as a range of IP addresses in a Classless Inter-Domain Routing (CIDR) notation in which the number after the '/' character represents a count of leading 1 bits in a subnet mask defining the range. For example, the range 192.168.0.0/24 refers to a range of IP addresses beginning with 192.168.0.0 and ending with 192.168.0.255.

In this example, the optimization engine 310 identifies that the workload identifier 192.168.0.133 in Group E is redundant because it is included in the range 192.168.0.0/24. Similarly, in Group D, identifier 192.168.0.225 is redundant because it is included in the range 192.168.0.0/23. These redundant identifiers may therefore be removed. Furthermore, the optimization engine 310 may identify that the ranges 192.168.0.0/24 and 192.168.1.0/24 can be more compactly represented by the single range 192.168.0.0/23. The identifiers may also be numerically ordered. The normalized workload identifiers are shown in Table 6:

TABLE 6

| Group | Workload Identifiers |
| --- | --- |
| E | 10.0.0.5 |
|   | 192.168.0.0/23 |
|   | 192.168.3.63 |
| B | 192.168.5.0/23 |
| D | 10.0.0.5 |
|   | 192.168.0.0/23 |
|   | 192.168.3.63 |

After normalizing the workload identifiers in each group, the optimization engine 310 compares the sets of workload identifiers and determines that, in this example, the resulting group of workloads in group E and group D are the same.

In an embodiment, the comparison of the normalized groups of workloads can be performed by assigning a unique group identifier to each normalized list. Here, a hash may be computed on the normalized ordered list of identifiers that results in a hash value uniquely representing the ordered list. The hashes can then be quickly compared to identify matching groups. Thus, in the example above, the same group identifier is assigned to groups E and D because they correspond to the same set of workload identifiers.

Thus, the three groups in the originally received membership information are collapsed into two groups as indicated in the following Table 7:

TABLE 7

| Group | Workload Identifiers |
| --- | --- |
| B | 192.168.5.0/23 |
| F | 10.0.0.5 |
|   | 192.168.0.0/23 |
|   | 192.168.3.63 |

The updated membership information may be stored to the group membership store 340.

The optimization engine 310 then re-maps 440 the reduced set of rules to the new group identifiers for the respective groups to which each rule is applicable. For example, as illustrated in Table 8 below, the group identifier E and D is replaced with the new group identifier F in the rule set, thus resulting in the following reduced set of rules:

TABLE 8

| Rule No. | Group | Port/Protocol |
|---|---|---|
| 1 | F | 80/TCP |
| 2 | B | 53/UDP |
| 3 | F | 5432/TCP |

The enforcement module 210 then programs the firewall 220 using the reduced set of rules and the reduced membership information defining the workload groups.

In alternative embodiments, the collapsing of rules based on the communication constraints and collapsing of the workload groups based on matching sets of workloads may be performed in either order or may be performed iteratively as new groups are formed from combining rules.

The described embodiments beneficially simplifies the rules used to configure the firewall 220 to enforce a segmentation policy. Although the examples above are simplified by using only a very small number of rules and workload groups, a typical segmentation policy may results in hundreds or thousands of rules and workload groups, the number of which can be reduced significantly by the above-described process. As a result, performance of the firewall 220 can be significantly improved and reduced computational resources may be utilized.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for reducing a number of firewall rules for enforcing a segmentation policy, the method comprising:
    obtaining, at an enforcement module of a distributed firewall system, initial management instructions for controlling communications of a target workload executing on an operating system instance of a computing device, the initial management instructions comprising:
        (a) an initial set of rules, wherein each rule specifies:
            (i) at least one group of workloads permitted to communicate with the target workload under the rule, and
            (ii) a constraint on the communications between the target workload and the at least one group of workloads associated with the rule, and
        (b) initial membership information providing, for respective groups of workloads in the initial set of rules, a set of workload identifiers having membership in each of the respective groups of workloads;
    identifying, in the initial set of rules, unique constraints on communications of the target workload with the respective groups of workloads;
    collapsing the initial set of rules into a reduced set of rules that combines groups of workloads referenced in rules having common constraints into combined groups of workloads each associated with only one of the unique constraints;
    generating, from the initial membership information and the combined groups, a reduced set of group identifiers that each represent a unique group of workloads;
    re-mapping the reduced set of rules to the reduced set of group identifiers; and
    configuring, by the enforcement module, a firewall executing on the operating system instance according to the re-mapped rules to enforce the segmentation policy with respect to traffic to and from the target workload.

2. The method of claim 1, wherein the initial set of rules comprises at least a first initial rule referencing a first group of workloads permitted to communicate with the target workload in accordance with a first connection constraint, and a second initial rule referencing a second group of workloads permitted to communicate with the target workload in accordance with a second connection constraint, wherein generating the reduced set of rules comprises:
    determining that the first connection constraint and the second connection constraint are a matching connection constraint;
    collapsing the first initial rule and the second initial rule into a collapsed rule specifying the matching connection constraint and specifying that a union of the first group of workloads and the second group of workloads are permitted to communicate with the target workload in accordance with the matching connection constraint; and replacing the first initial rule and the second initial rule with the collapsed rule in the reduced set of rules.

3. The method of claim 2, wherein the first connection constraint comprises a first port and protocol and wherein the second connection constraint comprises a second port and protocol matching the first port and protocol.

4. The method of claim 1, wherein the membership information comprises at least a first group of workload identifiers for workloads in a first workload group and a second group of workload identifiers for workloads in a second workload group, wherein generating the reduce set of group identifiers comprises:

determining that the first group of workload identifiers and the second group of workload identifiers are a matching set of workload identifiers; and assigning a unique group identifier to the matching set of workload identifiers.

5. The method of claim 4, wherein determining that the first group of workload identifiers and the second group of workload identifiers are a matching set of workload identifiers comprises:

removing first redundant workload identifiers within the first set of workload identifiers and ordering the first set of workload identifiers according to predefined ordering rules to generate a first processed set of workload identifiers;

removing second redundant workload identifiers within the second set of workload identifiers and ordering the second set of workload identifiers according to the predefined ordering rules to generate a second processed set of workload identifiers; and comparing the first processed set of workload identifier to the second processed set of workload identifier to identify the matching set of workloads.

6. The method of claim 5, wherein comparing the first processed set of workload identifiers to the second processed set of workload identifiers comprises:

computing a first hash of the first processed set of workload identifiers;

computing a second hash of the second processed set of workload identifiers; and comparing the first hash to the second hash to identify the matching set of workloads.

7. The method of claim 1, wherein generating, the reduced set of group identifiers that each represent a unique group of workloads comprises:

computing respective hashes for each of the respective groups of workloads from the set of workload identifiers;

identifying matching hashes;

generating the reduced set of group identifiers by combining groups with the matching hashes.

8. A method for optimizing management instructions for enforcing a segmentation policy, the method comprising:

receiving, by an enforcement agent executing on an operating system instance of a computing device, an initial rule set for enforcing the segmentation policy with respect to a target workload by a local firewall of a distributed firewall, the initial rule set including:

a first initial rule permitting communications between a first group of workloads with the target workload executing on the operating system instance in accordance with a first connection constraint, and a second initial rule permitting communications between a second group of workloads with the target workload executing on the operating system instance in accordance with a second connection constraint;

receiving, by the enforcement agent, first membership information specifying a first set of workload identifiers having membership in the first group of workloads, second membership information specifying a second set of workload identifiers having membership in the second group of workloads;

processing the first membership information and the second membership information to determine that the first set of workload identifiers and the second set of workload identifiers are a matching set of workload identifiers;

assigning a unique group identifier to the matching set of workload identifiers;

generating from the initial rule set, a simplified first rule and a simplified second rule each referencing the unique group identifier for the matching set of workload identifiers; and configuring, by the enforcement module, the local firewall executing on the operating system instance to enforce the reduced rule set with respect to traffic to and from the target workload.

9. The method of claim 8, wherein processing the first membership information and the second membership information comprises:

removing first redundant workload identifiers within the first set of workload identifiers and ordering the first set of workload identifiers according to predefined ordering rules to generate a first processed set of workload identifiers;

removing second redundant workload identifiers within the second set of workload identifiers and ordering the second set of workload identifiers according to the predefined ordering rules to generate a second processed set of workload identifiers; and comparing the first processed set of workload identifier to the second processed set of workload identifier to identify the matching set of workloads.

10. The method of claim 9, wherein comparing the first processed set of workload identifiers to the second processed set of workload identifiers comprises:

computing a first hash of the first processed set of workload identifiers;

computing a second hash of the second processed set of workload identifiers; and comparing the first hash to the second hash to identify the matching set of workloads.

11. The method of claim 8, further comprising:

determining that the first connection constraint and the second connection constraint are a matching connection constraint;

collapsing the first rule and the second rule into a collapsed rule specifying the matching connection constraint and specifying that a union of the first group of workloads and the second group of workloads are permitted to communicate with the operating system instance in accordance with the matching connection constraint.

12. The method of claim 8, wherein the first connection constraint comprises a first port and protocol and wherein the second connection constraint comprises a second port and protocol.

13. A method for simplifying a firewall rule set for enforcing a segmentation policy, the method comprising:

receiving, by an enforcement agent executing on an operating system instance of a computing device, an initial rule set for enforcing the segmentation policy with respect to a target workload by a local firewall of a distributed firewall, the initial rule set including:
  a first initial rule permitting communications between a first group of workloads with the target workload executing on the operating system instance in accordance with a first connection constraint, and
  a second initial rule permitting communications between a second group of workloads permitted to communicate with the target workload in accordance with a second connection constraint;
receiving, by the enforcement agent, first membership information specifying a first set of workload identifiers having membership in the first group of workloads and second membership information specifying a second set of workload identifiers having membership in the second group of workloads;
determining that the first connection constraint and the second connection constraint are a matching connection constraint;
collapsing the first initial rule and the second initial rule into a collapsed rule specifying the matching connection constraint and specifying that a union of the first group of workloads and the second group of workloads are permitted to communicate with the target workload in accordance with the matching connection constraint;
generating from the initial rule set, a reduced rule set that replaces the first initial rule and the second initial rule with the collapsed rule; and
configuring, by the enforcement module, the local firewall executing on the operating system instance to enforce the reduced rule set with respect to traffic to and from the target workload.

14. The method of claim 13, further comprising:
processing the first membership information and the second membership information to determine that the first set of workload identifiers and the second set of workload identifiers are a matching set of workload identifiers;
assigning a unique group identifier to the matching set of workload identifiers.

15. The method of claim 13, wherein the first connection constraint comprises a first port and protocol and wherein the second connection constraint comprises a second port and protocol.

16. A non-transitory computer-readable storage medium storing instructions for reducing a number of firewall rules for enforcing a segmentation policy, the instructions when executed by a processor causing the processor to perform steps including:
obtaining, at an enforcement module of a distributed firewall system, initial management instructions for controlling communications of a target workload executing on an operating system instance of a computing device, the initial management instructions comprising:
  (a) an initial set of rules, wherein each rule specifies:
    (i) at least one group of workloads permitted to communicate with the target workload under the rule, and
    (ii) a constraint on the communications between the target workload and the at least one group of workloads associated with the rule, and
  (b) initial membership information providing, for respective groups of workloads in the initial set of rules, a set of workload identifiers having membership in each of the respective groups of workloads;
identifying, in the initial set of rules, unique constraints on communications of the target workload with the respective groups of workloads;
collapsing the initial set of rule into, a reduced set of rules that combines groups of workloads referenced in rules having common constraints into combined groups of workloads each associated with only one of the unique constraints;
generating, from the initial membership information, a reduced set of group identifiers that each represent a unique group of workloads;
re-mapping the reduced set of rules to the reduced set of group identifiers; and
configuring, by the enforcement module, a firewall executing on the operating system instance according to the re-mapped rules to enforce the segmentation policy with respect to traffic to and from the target workload.

17. The non-transitory computer-readable storage medium of claim 16, wherein the initial set of rules comprises at least a first initial rule referencing a first group of workloads permitted to communicate with the target workload in accordance with a first connection constraint, and a second initial rule referencing a second group of workloads permitted to communicate with the target workload in accordance with a second connection constraint, wherein generating the reduced set of rules comprises:
determining that the first connection constraint and the second connection constraint are a matching connection constraint;
collapsing the first initial rule and the second initial rule into a collapsed rule specifying the matching connection constraint and specifying that a union of the first group of workloads and the second group of workloads are permitted to communicate with the target workload in accordance with the matching connection constraint; and
replacing the first initial rule and the second initial rule with the collapsed rule in the reduced set of rules.

18. The non-transitory computer-readable storage medium of claim 17, wherein the first connection constraint comprises a first port and protocol and wherein the second connection constraint comprises a second port and protocol matching the first port and protocol.

19. The non-transitory computer-readable storage medium of claim 16, wherein the membership information comprises at least a first group of workload identifiers for workloads in a first workload group and a second group of workload identifiers for workloads in a second workload group, wherein generating the reduce set of group identifiers comprises:
determining that the first group of workload identifiers and the second group of workload identifiers are a matching set of workload identifiers; and
assigning a unique group identifier to the matching set of workload identifiers.

20. The non-transitory computer-readable storage medium of 19, wherein determining that the first group of workload identifiers and the second group of workload identifiers are a matching set of workload identifiers comprises:
removing first redundant workload identifiers within the first set of workload identifiers and ordering the first set of workload identifiers according to predefined ordering rules to generate a first processed set of workload identifiers;

removing second redundant workload identifiers within the second set of workload identifiers and ordering the second set of workload identifiers according to the predefined ordering rules to generate a second processed set of workload identifiers; and comparing the first processed set of workload identifier to the second processed set of workload identifier to identify the matching set of workloads, wherein comparing the first processed set of workload identifiers to the second processed set of workload identifiers comprises:

computing a first hash of the first processed set of workload identifiers;

computing a second hash of the second processed set of workload identifiers; and comparing the first hash to the second hash to identify the matching set of workloads.

\* \* \* \* \*